(12) United States Patent
Sho et al.

(10) Patent No.: US 8,334,985 B2
(45) Date of Patent: Dec. 18, 2012

(54) SHAPE MEASURING APPARATUS AND SHAPE MEASURING METHOD

(75) Inventors: To Sho, Kizugawa (JP); Takashi Sakai, Nara (JP); Daisuke Mitsumoto, Nagaokakyo (JP); Yasuhiro Ohnishi, Kyotanabe (JP); Takeshi Kojima, Kyoto (JP); Yasumoto Mori, Joyo (JP); Shree Nayar, New York, NY (US)

(73) Assignee: OMRON Corporation, Kyoto (JP)

( * ) Notice: Subject to any disclaimer, the term of this patent is extended or adjusted under 35 U.S.C. 154(b) by 286 days.

(21) Appl. No.: 12/901,123

(22) Filed: Oct. 8, 2010

(65) Prior Publication Data

US 2012/0086950 A1   Apr. 12, 2012

(51) Int. Cl.
*G01B 11/24* (2006.01)
*G06K 9/36* (2006.01)

(52) U.S. Cl. .......................... 356/601; 356/625; 382/285

(58) Field of Classification Search .......... 356/601–614, 356/625–636; 382/118, 154, 190, 285; 345/582–588, 419, 420; 348/135, 187
See application file for complete search history.

(56) References Cited

U.S. PATENT DOCUMENTS

| | | | | | |
|---|---|---|---|---|---|
| 5,305,092 | A | * | 4/1994 | Mimura et al. | 356/609 |
| 5,627,771 | A | * | 5/1997 | Makino | 702/155 |
| 6,621,921 | B1 | * | 9/2003 | Matsugu et al. | 382/154 |
| 7,106,432 | B1 | | 9/2006 | Mapoles et al. | |
| 7,453,456 | B2 | * | 11/2008 | Petrov et al. | 345/419 |
| 7,561,164 | B2 | * | 7/2009 | Baumberg | 345/582 |
| 7,724,379 | B2 | * | 5/2010 | Kawasaki et al. | 356/603 |
| 2007/0150228 | A1 | * | 6/2007 | Fukumoto et al. | 702/155 |
| 2008/0008399 | A1 | * | 1/2008 | Marugame et al. | 382/285 |
| 2009/0116023 | A1 | | 5/2009 | Wadman | |
| 2009/0262989 | A1 | * | 10/2009 | Kozakaya | 382/118 |
| 2010/0182595 | A1 | | 7/2010 | Jang | |
| 2011/0169948 | A1 | * | 7/2011 | Ohtomo et al. | 348/135 |

FOREIGN PATENT DOCUMENTS

| | | |
|---|---|---|
| JP | 3218407 A | 9/1991 |
| JP | 3553652 A | 3/1996 |
| JP | 2002 286 433 A | 10/2002 |
| JP | 2007196193 A | 8/2007 |
| KR | 10-0585270 B1 | 5/2006 |

OTHER PUBLICATIONS

International Search Report and Written Opinion Issued in PCT Application No. PCT/US2011/054534, Dated May 2, 2012 (10 Pages).

* cited by examiner

*Primary Examiner* — Sang Nguyen
(74) *Attorney, Agent, or Firm* — Osha Liang LLP

(57) ABSTRACT

A shape measuring apparatus that measures a three-dimensional shape of a measuring target has a lighting device that irradiates the measuring target placed on a stage with light, an imaging device that takes an image of the measuring target, a shape calculating device that calculates orientations of normals at a plurality of points on a surface of the measuring target from an image, the image being obtained by performing imaging with the imaging device while the lighting device irradiates the measuring target with the light, the shape calculating device calculating the three-dimensional shape of the surface of the measuring target from the calculation result of the orientations of the normals, a ranging device that measures a distance from a predetermined reference position with respect to at least one point on the surface of the measuring target, and a determination device that determines a spatial position of the three-dimensional shape of the surface of the measuring target, the three-dimensional shape being obtained by the shape calculating device using information on the distance obtained by the ranging device.

13 Claims, 14 Drawing Sheets

SHAPE MEASURING APPARATUS AND SHAPE MEASURING METHOD

BACKGROUND OF THE INVENTION

1. Technical Field

The present invention relates to a technique of measuring a three-dimensional shape of a surface of a measuring target.

2. Related Art

There is known a technique of measuring a surface shape (three-dimensional shape) of a measuring target by analyzing an image of the measuring target taken by a camera. As to a technique of measuring the surface shape of a mirror surface object, for example, there is a method, in which plural pieces of lighting having different features are used to take images of the mirror surface object with light reflected from the mirror surface and a normal direction of the object surface is calculated from the images (for example, see Japanese Patent No. 3553652). When the normals are obtained at a plurality of points on the object surface, the three-dimensional shape of the object surface can be restored by converting the normals into gradients to integrate the gradients (for example, see Japanese Unexamined Patent Publication No. 3-218407). As to a technique of measuring the surface shape of a diffusing object, there is a method, in which a fringe pattern is projected to the object to analyze a pattern deformation generated according to irregularity of the object surface, thereby analyzing the three-dimensional shape of the object surface. An optical cutting method, a phase shift method, and a fringe analysis method are known as typical examples of the technique of measuring the surface shape of the diffusing object (for example, see Japanese Unexamined Patent Publication Nos. 2002-286433 and 2007-196193).

In the field of an automatic measuring apparatus or an automatic inspection apparatus, there is a need to accurately measure the surface shape of the mirror surface object such as metal. For example, in soldering inspection of a board appearance inspection apparatus, there is a demand to correctly recognize the three-dimensional shape in the soldering portion in order to detect contact failure between a land and a chip or existence of a short circuit without error.

SUMMARY

In the methods disclosed in Japanese Patent No. 3553652 and Japanese Unexamined Patent Publication No. 3-218407, since a distance in a depth direction (Z-direction) of a camera (that is, a distance between the camera and the object surface) cannot be measured although the surface shape of the object can be restored, a Z-direction position (height) cannot be specified in a three-dimensional space of the restored surface shape. For example, for the soldering inspection, when the height is unknown in the soldering portion, there is a risk of not correctly inspecting excess or deficiency of a soldering amount or existence of a gap between the soldering and the land. On the other hand, in the methods disclosed in Japanese Unexamined Patent Publication Nos. 2002-286433 and 2007-196193, although the Z-direction position (height) of the object surface can be measured, the methods are not suitable for the measurement of the mirror surface object. This is because, for the object having strong mirror surface reflection, reflected light intensity of the projection pattern varies depending on a reflectance property of the object surface so that the measurement accuracy is not stabilized, and the surface shape cannot be correctly restored.

One or more embodiments of the present invention provides a technique of accurately measuring a three-dimensional shape and a spatial position of a mirror surface object.

According to one or more embodiments of the present invention, the three-dimensional shape and spatial position of the measuring target are determined by combining the three-dimensional shape of the object surface, which is restored by normal calculation, and information on height (a distance from a reference position) of the object surface, which is obtained by a ranging function.

Specifically, one or more embodiments of the present invention provides a shape measuring apparatus that measures a three-dimensional shape of a measuring target, the apparatus including: a lighting device that irradiates the measuring target placed on a stage with light; an imaging device that takes an image of the measuring target; a shape calculating device that calculates orientations of normals at a plurality of points on a surface of the measuring target from an image, the image being obtained by performing imaging with the imaging device while the lighting device irradiates the measuring target with the light, the shape calculating device calculating the three-dimensional shape of the surface of the measuring target from the calculation result of the orientations of the normals; a ranging device that measures a distance from a predetermined reference position with respect to at least one point on the surface of the measuring target; and a determination device that determines a spatial position of the three-dimensional shape of the surface of the measuring target, the three-dimensional shape being obtained by the shape calculating device using information on the distance obtained by the ranging device.

According to such a configuration, the three-dimensional shape of the mirror surface object surface can be accurately restored by the normal calculation. Moreover, the spatial position of the restored three-dimensional shape can be determined by using the distance information obtained with the ranging device, so that not only the three-dimensional shape of the measuring target but also the spatial position of the measuring target can be easily and accurately measured.

According to one or more embodiments of the present invention, the ranging device includes a projection device that projects a fringe pattern or a lattice pattern to the measuring target, and the ranging device calculates the distance of the point on the surface of the measuring target by analyzing the image of the measuring target, the image of the measuring target being taken while the fringe pattern or the lattice pattern is projected. In one or more embodiments of the present invention, since the three-dimensional shape is measured by the image analysis, the image analysis technique is also adopted for the ranging, which allows the effects such as simplification and miniaturization of the apparatus configuration to be obtained by the sharing of the hardware.

According to one or more embodiments of the present invention, the imaging device also acts as a device with which the ranging device takes an image for ranging. That is, the observation system (imaging device) is shared by the shape measurement and the ranging. Therefore, the alignment between image coordinates of the shape measurement result and the ranging result can be eliminated to simplify processing and improve accuracy.

According to one or more embodiments of the present invention, the lighting device is a surface light source including a light emission region having a predetermined size, and pieces of light emitted from positions in the light emission region differ from each other in a spectral distribution. By using such a lighting device, the three-dimensional shape of the measuring target can be determined by only one-time measurement (lighting and image taking), and therefore the measuring time can be shortened.

According to one or more embodiments of the present invention, the lighting device is the surface light source that emits light in which a plurality of different lighting patterns are overlapped with each other or sequentially emits the plurality of lighting patterns, and each of the lighting patterns is set such that emission intensity changes linearly with respect to an angle around a central axis, a specific straight line that is parallel to the stage to pass through a point at which the measuring target is placed being defined as the central axis. By using such a lighting device, accurate measurement can be performed even if the object has the uneven reflectance property or rough surface. Occasionally the exact linearity is hardly realized due to a structural design factor. In such cases, the linearity may substantially be realized. That is, in one or more embodiments of the invention, "emission intensity changes linearly" means a concept including "emission intensity changes substantially linearly".

One or more embodiments of the invention can be recognized as a shape measuring apparatus including at least part of the device. One or more embodiments of the invention can be recognized as a shape measuring method including at least part of the processing or a program realizing the method. One or more embodiments of the invention can be made by combining the devices and the pieces of processing as much as possible.

According to one or more embodiments of the invention, the three-dimensional shape and the spatial position of the mirror surface object can be accurately measured. Further, the three-dimensional shape and the spatial position can be accurately measured for only the mirror surface object, only the diffusing object, or the object in which the mirror surface object and diffusing object are mixed.

BRIEF DESCRIPTION OF THE DRAWINGS

FIG. 3A is a perspective view, and FIG. 3B is a side view;

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Embodiments of the present invention will be described below with reference to the drawings. A shape measuring apparatus according to an embodiment of the invention performs three-dimensional measurement of a mirror surface object by means of image analysis. The shape measuring apparatus according to one or more embodiments of the present invention can be applied to object recognition in various fields such as an automatic measuring apparatus, an automatic inspection apparatus, and robot vision. For example, the shape measuring apparatus can be applied to a soldering inspection in a board appearance inspection apparatus (AOI system) and an irregularity inspection of a surface of a metal-working product.

<Entire Configuration of Measuring Apparatus>

Figure 1:
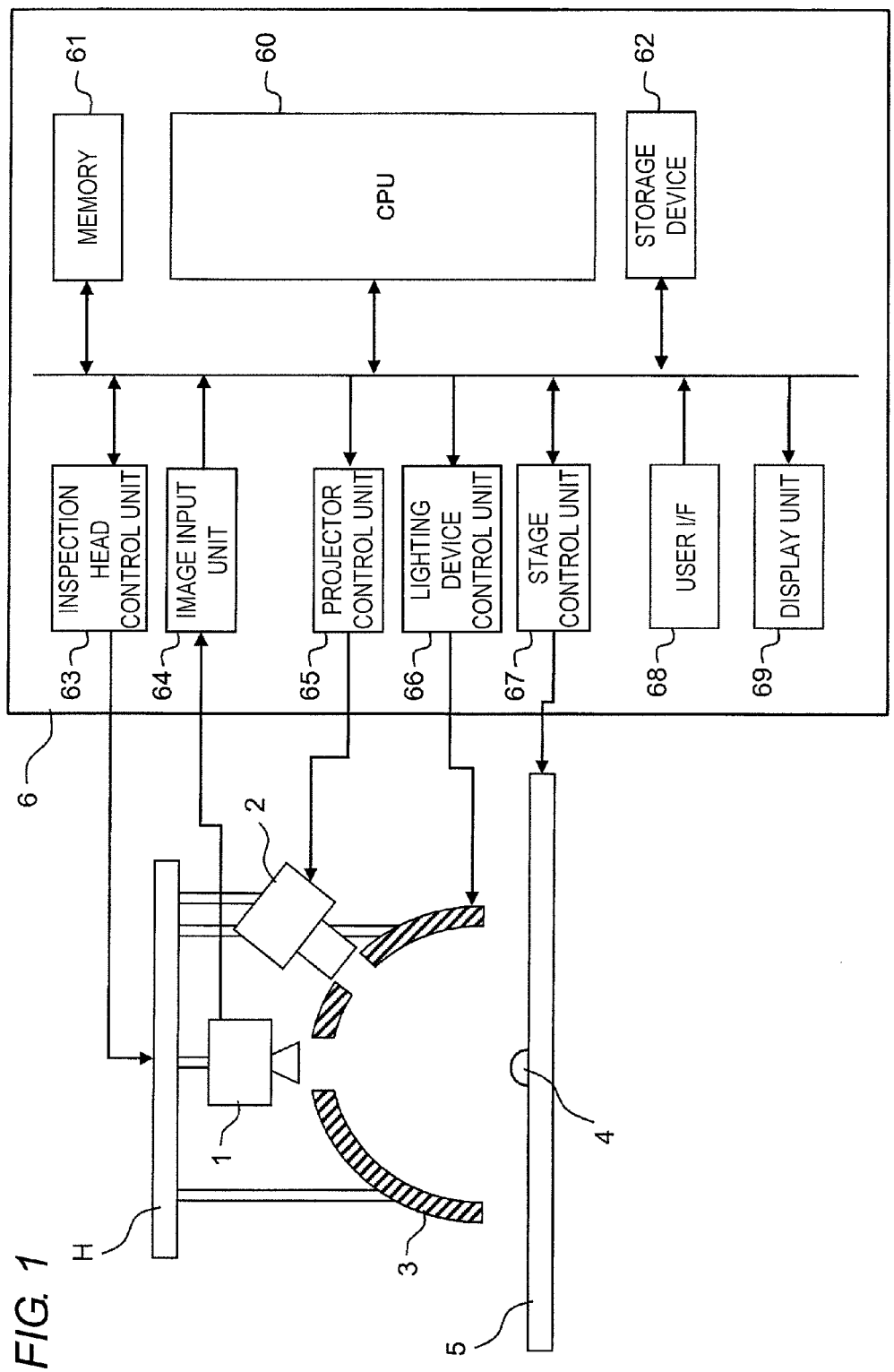
FIG. 1 is a view schematically showing a hardware configuration of a shape measuring apparatus.

An entire configuration of the shape measuring apparatus according to one or more embodiments of the present invention will be described with reference to FIG. 1. FIG. 1 is a view schematically showing a hardware configuration of the shape measuring apparatus.

The shape measuring apparatus roughly includes a measurement stage 5, an inspection head H, and an information processing device 6. A lighting device 3, a projector 2, and a camera (image sensor) 1 are attached to the inspection head H. The lighting device 3 irradiates a measuring target 4 placed on the measurement stage 5 with measuring light. The projector 2 projects a specific fringe pattern to a surface of the measuring target 4. The camera 1 takes an image of the measuring target 4 from vertically above. The information processing device 6 includes a CPU (Central Processing Unit) 60, a memory 61, a storage device 62, an inspection head control unit 63, an image input unit 64, a projector control unit 65, a lighting device control unit 66, a stage control unit 67, a user I/F 68, and a display unit 69. The inspection head control unit 63 has a function of controlling movement of the inspection head H in a Z-direction (a direction perpendicular to the measurement stage 5), and the stage control unit 67 has a function of controlling movement of the measurement stage 5 in an XY-direction. The projector control unit 65 has a function of controlling lighting and lights-out or a change of a projection pattern of the projector 2. The lighting device control unit 66 has a function of controlling the lighting and lights-out of the lighting device 3 (and a change of a lighting pattern as the need arises). The image input unit 64 has a function of capturing a digital image from the camera 1. The user I/F 68 is an input device that is operated by a user. Examples of the user I/F 68 include a pointing device, a touch panel, and a keyboard. Measurement result is displayed on a screen of the display unit 69. For example, the display unit 69 is formed by a liquid crystal display.

The shape measuring apparatus according to one or more embodiments of the present invention has two measuring functions, that is, "shape measurement" and "ranging". One of the features of the shape measuring apparatus according to one or more embodiments of the present invention is that the three-dimensional shape and spatial position of the measuring target 4 are simply and accurately determined by combining the three-dimensional shape of the object surface, which is obtained by the shape measuring function, and the distance (height) information on the object surface, which is obtained by the ranging function. In this case, the shape measuring function is formed by the lighting device 3, the camera 1, and the information processing device 6, and the ranging function is formed by the projector 2, the camera 1, and the information processing device 6. That is, in the two measuring functions, although the different light sources are used, the identical observation system (camera 1) is used to measure the light reflected from the measuring target 4.

During the measurement, the inspection head H and the measurement stage 5 move relatively, and the measuring target 4 is positioned at a predetermined measurement position (in the example of FIG. 1, the center (an intersection point of an optical axis of the camera 1 and the measurement stage 5) of the lighting device 3). An image for shape measurement is taken while the lighting device 3 irradiates the measuring target 4 with measuring light, and then the projector 2 projects a color pattern to take an image for ranging. The shape measurement and the ranging may be performed in the reverse order. The information processing device 6 captures the image taken by the camera 1 through the image input unit 64, and the image is used in image analysis. A configuration and processing of each measuring function will be described in detail.

<Shape Measurement>

The shape measuring function is a function of measuring the three-dimensional shape of the measuring target surface. In this case, the following method of measuring a normal of the object surface using structured lighting to restore a surface shape is adopted, because a mirror surface object such as metal becomes the measuring target.

(Lighting Device)

The lighting device 3 is a surface light source having a dome shape as shown in FIG. 1, and the whole dome-shape is a light emission region. Openings for the camera 1 and projector 2 are provided in a vertex portion and a side portion of the lighting device 3, respectively. For example, the lighting device 3 can be formed by a dome-shape color filter and a light source that externally irradiates the measuring target 4 with white light. Alternatively, a plurality of LED chips may be arrayed inside the dome to irradiate the measuring target 4 through a diffuser plate. Alternatively, a liquid crystal display or an organic EL display may be formed into the dome shape to constitute the lighting device 3.

According to one or more embodiments of the present invention, the light emission region of the lighting device 3 is formed into the hemispherical dome shape such that the measuring target 4 is irradiated with light from all directions. Therefore, the normals in all directions can be measured. However, the light emission region may be formed into any shape as long as the measuring target 4 is irradiated with light from a position corresponding to a normal direction of the measuring target. For example, when the orientation of the normal to the surface is substantially limited to a vertical direction, it is not necessary to irradiate the measuring target 4 with light from a horizontal direction (a shallow angle direction).

Figure 2:
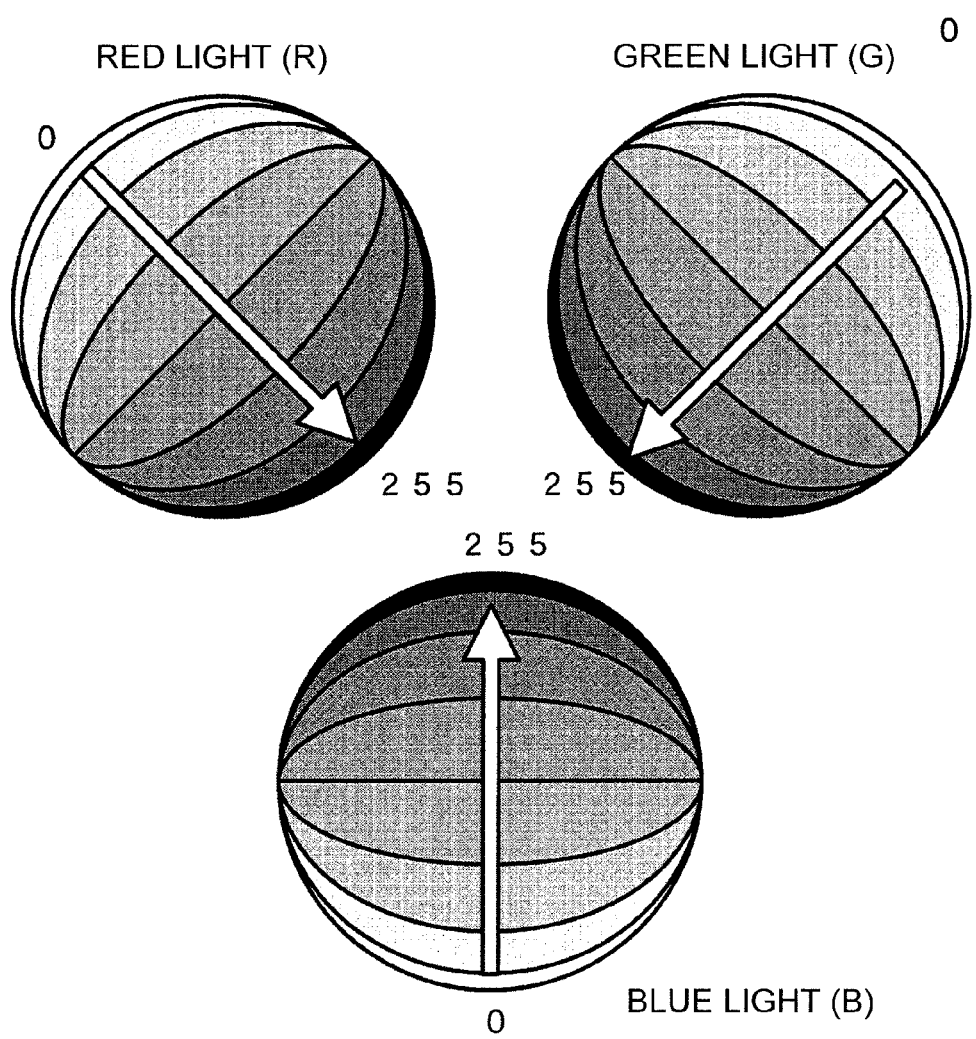
FIG. 2 is a view showing a color pattern in a light emission region of a lighting device in each of RGB.

The light emission is set such that pieces of light having different spectral distributions are emitted at all positions in the light emission region of the lighting device 3. For example, when the light emission is realized by combining three color light components of red light (R), green light (G), and blue light (B), emission intensity of each of RGB component is changed in a different direction on the dome as shown in FIG. 2. In this case, change directions are set to 120 degrees with respect to one another. By means of the combination of the RGB components, the light emissions at the positions in the light emission region differ from one another in the combination of the RGB components. Accordingly, the pieces of light having different spectral distributions are emitted at all the positions, and the light emission can be set such that the pieces of light having the different spectral distributions (intensity ratio of RGB) are incident to the measuring target 4 depending on the incident direction. Not only the three color components but also three or more color components (color channel) may be used.

Figure 3A:
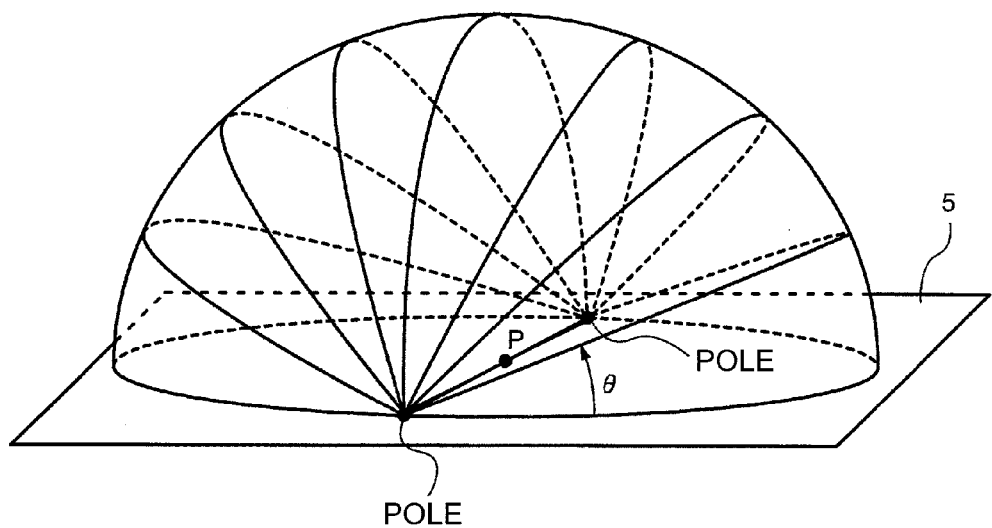
FIGS. 3A and 3B are views describing a change in each color of RGB in the light emission region of the lighting device, where
Figure 3B:
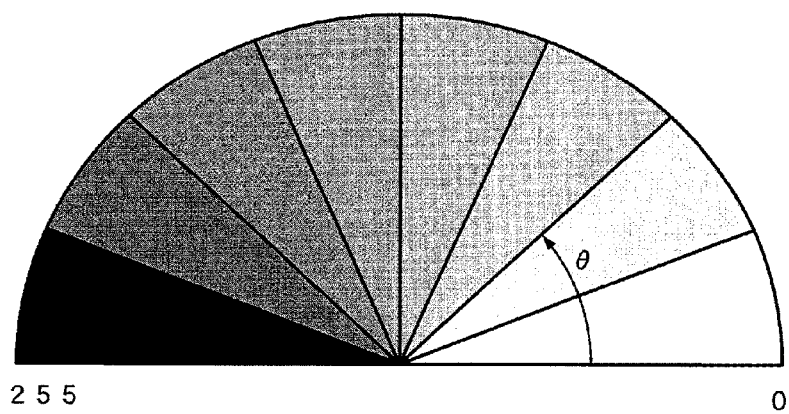

FIGS. 3A and 3B show a change in intensity (lighting pattern) of one of the component light beams in FIG. 2. FIG. 3A is a perspective view showing an isochromatic (iso-emission intensity) line of one of the component light beams. FIG. 3B is a side view corresponding to FIG. 3A. An intersection line of the dome (hemisphere) and a plane passing through a diameter of the dome becomes an isochromatic line as shown in FIGS. 3A and 3B. For the sake of convenience, FIG. 2 and FIGS. 3A and 3B show that the emission intensity of each of the RGB components changes in a stepwise manner (changes in eight steps in FIG. 2 and FIGS. 3A and 3B). However, actually the emission intensity (luminance) of each of the component light beams changes continuously. The change in emission intensity is set so as to change linearly with respect to an angle. More specifically, assuming that $L_{min}$ is a minimum value of the emission intensity, $L_{max}$ is a maximum value of the emission intensity, and $\theta$ is an angle formed by a horizontal plane (measurement stage 5) and a plane including the isochromatic line, emission intensity $L(\theta)$ on the isochromatic line is set so as to satisfy a relationship of $L(\theta)=L_{min}+(L_{max}-L_{min})\times(\theta/\pi)$. As shown in FIG. 3A, when a "pole" is defined, $\theta$ constitutes a longitude, and the light source distribution (lighting pattern) according to one or more embodiments of the present invention can be expressed so as to change linearly with respect to the longitude. Alternatively, assuming that a central axis is a straight line that is parallel to the measurement stage 5 to pass through a point O at which the measuring target is placed, the lighting pattern can be expressed such that the emission intensity changes linearly with respect to the angle $\theta$ around the central axis.

Figure 4:
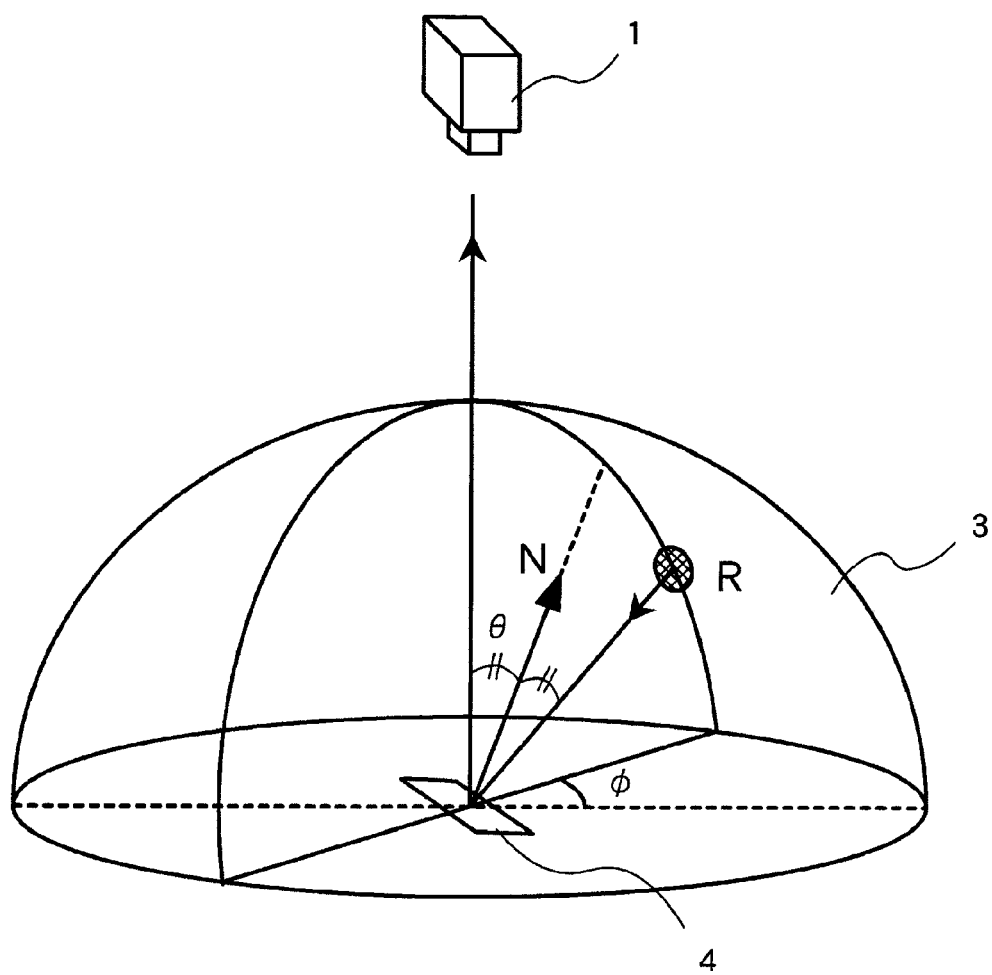
FIG. 4 is a view describing a correspondence of an orientation of a normal of a measuring target surface and a light emission region.

The surface shape (the orientation of the normal) of the measuring target can be measured from only one image by utilizing the lighting device having the above-described light source distribution (lighting pattern). This will be described with reference to FIG. 4. It is assumed that the normal at a certain point on the surface of the measuring target 4 has the orientation of an arrow N, a zenith angle $\theta$, and an azimuth angle $\phi$. In this case, the light is emitted in a region R of the lighting device 3 and incident to the measuring target 4, and the color of the point whose image is taken by the camera 1 becomes the light reflected from the measuring target 4. Thus, the orientation ($\theta$, $\phi$) of the normal to the surface and the direction (the position in the light emission region of the lighting device 3) of the incident light are correlated with each other one-to-one. Because the pieces of light incident from the different directions have the different spectral distributions (the pieces of light having the different spectral distributions are emitted at all the positions in the light emission region), the orientation of the normal at the point can be calculated with respect to both the zenith angle and the azimuth angle by checking the color (spectral distribution) of the taken image.

(Normal Calculation and Shape Restoration)

Figure 5:
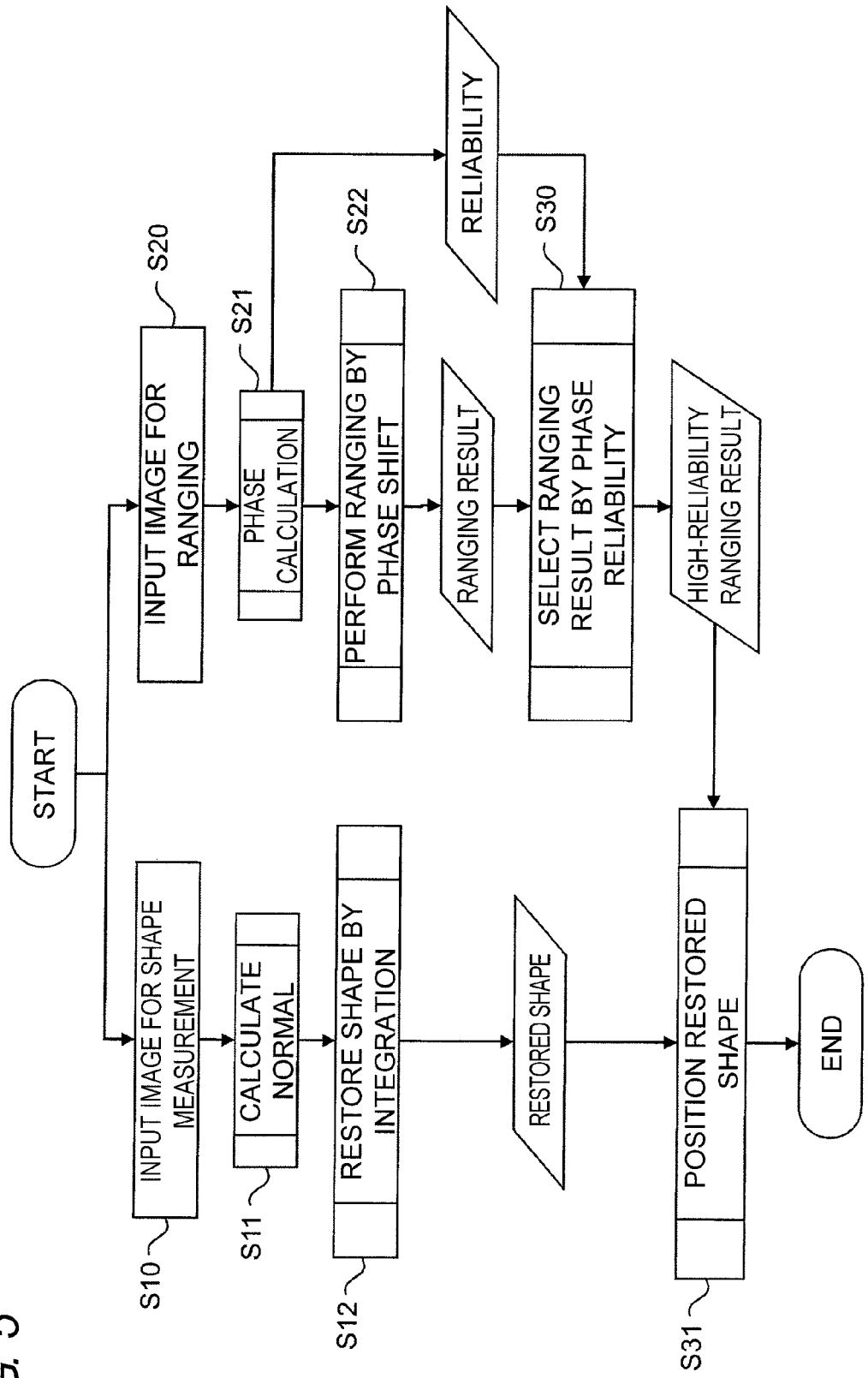
FIG. 5 is a flowchart showing a flow of measurement processing.
Figure 6:
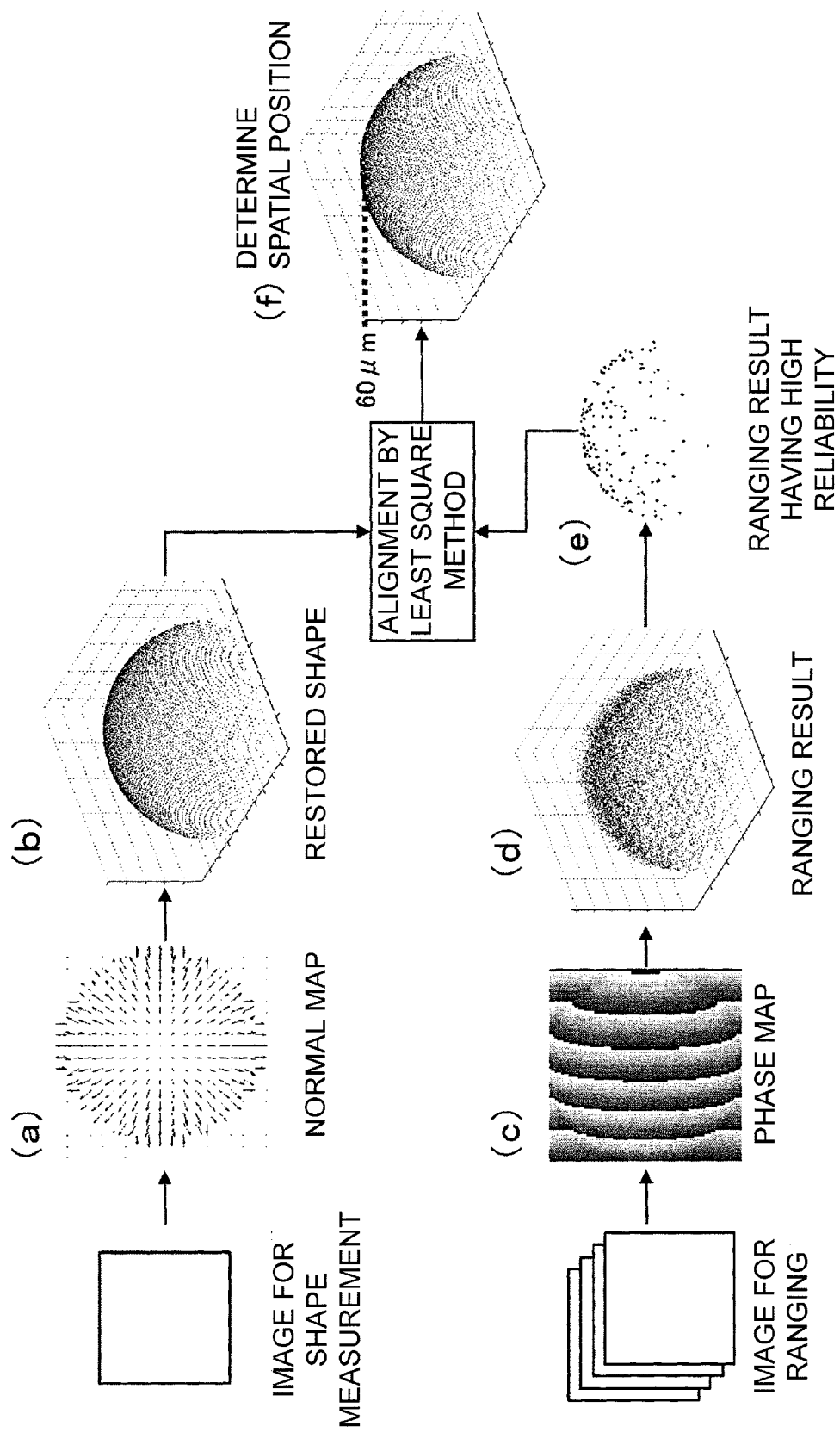
FIG. 6 is a view schematically showing a flow of the measurement processing.

A function and a processing flow, which are related to the shape measurement, will be described below with reference to FIGS. 5 and 6. FIG. 5 is a flowchart showing a flow of measurement processing of the shape measuring apparatus, and FIG. 6 schematically shows a flow of the measurement processing. The processing shown in FIG. 5 is realized in a manner such that the CPU 60 of the information processing device 6 reads a program from the storage device 62 to execute the program. Some of or all the functional blocks may be formed by an ASIC or a PLD (Programmable Logic Device).

The CPU 60 captures the image for shape measurement through the image input unit 64 and calculates a feature quantity related to a spectral component of the reflected light from the image for shape measurement in each pixel of the measuring target portion (step S10). In one or more embodiments of the present invention, a ratio of the RGB components is used as the feature quantity because the lighting device 3 projects light in which three pieces of component light of the red light (R), green light (G), and blue light (B) are combined. For example, the maximum luminance is normalized by 1 in each of the RGB components, and the combination of (R, G, B) can be used as the feature quantity. Alternatively, a ratio of a certain color (in this case, G) to another color, for example, R/(R+G) or B/(B+G) may be used as the feature quantity.

As described above, the color of the measuring target 4, that is, the feature quantity calculated in step S10 and the orientation of the normal are correlated with each other one-to-one. A table describing a correlation of the orientation of the normal and a value of the feature quantity is stored in the storage device 62 of the information processing device 6. An image of an object such as a sphere whose shape is already known is taken by the lighting device 3 and the camera 1 to previously check the correlation of the normal and the feature quantity, which allows the table to be produced. For example, when a spherical object is used, the position from the center of the pixel of interest can be checked to determine the orientation of the normal by calculation. Then the correlation of the orientation of the normal and the feature quantity can be checked by computing the feature quantity at the position.

A correlation of the normal and the RGB values, a correlation of the direction (the zenith angle and the azimuth angle) of the incident light and the feature quantity value, or a correlation of the direction of the incident light and the RGB values may be described in the table instead of the correlation of the normal and the feature quantity. Alternatively, when the relationship between the orientation of the normal and the spectral distribution taken by the camera 1 can be formulated from a geometric disposition or the like, the normal may be calculated using the formulated equation.

The CPU 60 calculates the orientation of the normal at each point on the surface of the measuring target 4 from the table and the feature quantity calculated from the input image (step S11). A part (a) of FIG. 6 shows an example of a normal map that is calculated from the image of the hemispherical measuring target 4. The normal map is obtained by illustrating the normal at each point on the measuring target surface by a unit vector.

The CPU 60 converts the normals of the points obtained in step S11 into gradients and connects the gradients to restore the three-dimensional shape (step S12). The processing in steps S10 to S12 are referred to as "integration". A part (b) of FIG. 6 shows the shape restored from the normal map of the part (a). According to the integration, the three-dimensional shape of the surface of the mirror surface object can be accurately restored. However, since only a relative height at each point is calculated by building-up of the gradients, an absolute height (spatial position) is unknown in the restored whole three-dimensional shape. The ranging function of complementing the integration will be described below.

<Ranging>

The ranging function is used to measure the height (the distance from a predetermined reference position) of the measuring target surface. In this case, the height information on the point on the measuring target surface is obtained by utilizing the phase shift method.

The phase shift method is one of techniques, in which the fringe pattern is projected to the measuring target surface to analyze a pattern deformation caused by irregularity of the surface, thereby performing the three-dimensional measurement of the surface. Specifically, in the phase shift method, the processing of taking the image of the object surface while projecting the fringe pattern whose luminance changes in a sine-wave manner to the object surface is repeated a plurality of times while a phase of a change in luminance changes, thereby obtaining a plurality of images that differ from one another in brightness. Because the brightness (density value) of the identical pixel of each image changes similarly in a period identical to that of the change of the fringe pattern, the phase of each pixel can be obtained by applying the sine wave to the change in brightness of each pixel. The distance (height) can be calculated from a reference position by determining a phase difference with a phase of a predetermined reference position (such as a measurement table surface and a board surface).

As described above, the phase shift method is not suitable to the three-dimensional measurement of the mirror surface object in principle. However, in the actual mirror surface object, a diffuse reflection component is slightly included in the reflected light, or a surface oriented toward a regular reflection direction exists. Therefore, few points at which the height can be accurately measured exist. In one or more embodiments of the present invention, because the three-dimensional shape of the measuring target 4 is obtained by the normal integration, it is only necessary to accurately obtain the height information on at least one point (preferably a plurality of points) on the object surface in the ranging. For such a purpose, the phase shift method can be sufficiently used practically.

A function related to the ranging and a processing flow will be described below with reference to FIGS. 5 and 6.

The CPU 60 captures the image for ranging through the image input unit 64 (step S20). In this case, four images are obtained while the phase of the fringe pattern is deviated by $\pi/2$. The CPU 60 determines the phase of each pixel by applying the sine wave to the change in brightness of each pixel (step S21). A part (c) of FIG. 6 shows an example of the phase map that is calculated from the image of the hemispherical measuring target 4. The phase map is obtained by illustrating the pixels having the identical phase with the identical brightness. The CPU 60 then calculates the distance (height) from the phase of each pixel by a triangulation principle (step S22). A part (d) of FIG. 6 shows the ranging result thus obtained. When compared with the part (b) of FIG. 6, it is found that the ranging result obtained by the phase shift has low accuracy because of a large variation.

<Determination of Spatial Position>

When the restored shape of the measuring target 4 and the ranging result are obtained through the processing described above, a spatial position (height) of the restored shape is determined by combining the restored shape and the ranging results. Specifically, the CPU 60 performs processing of selecting the ranging result (height information) having high reliability from the ranging results of all the pixels (step S30). A score indicating a degree of matching between a curve of the change in brightness of the pixel and the sine wave can be used as an evaluation index of the reliability. The score is a value determined when the sine wave that is best matched with the change in brightness of the pixel is searched in step S21. In this case, only the ranging result of the pixel whose reliability value is higher than a predetermined threshold is selected. A part (e) of FIG. 6 shows an example of the selected ranging result. When compared with the part (d), it is found that the variation is considerably reduced. The evaluation index of the reliability is not limited to the degree of matching between the curve of the change in brightness of the pixel and the sine wave, but a phase amplitude determined from the change in brightness or a value determined from intensity of the regular reflection component may be used as the evaluation index of the reliability.

The CPU 60 positions the restored shape of the measuring target 4 using the ranging result (height information) obtained in step S30 (step S31). In this case, a Z-direction position of the restored shape that best fits the ranging result is determined by the least square method. Therefore, as shown in a part (f) of FIG. 6, the three-dimensional shape and position of the measuring target 4 can be fixed.

In one or more embodiments of the present invention, the ranging result (height information) is selected based on reliability. However, the selection is not necessary when the practically trouble-free accuracy is obtained even if the positioning of the three-dimensional shape is performed based on all the ranging results, or when the ranging result has the low score. When the selection is performed, the evaluation index is not limited to those described above, but any evaluation index may be used.

According to shape measuring apparatus according to one or more embodiments of the present invention, the height information determined by the ranging is combined with the restored shape determined by the shape measurement, which allows the three-dimensional shape and spatial position of the mirror surface object surface to be accurately measured. The observation system (camera) is shared by the ranging and the shape measurement, so that the positioning of an XY coordinate (image coordinate) between the shape measurement result and the ranging result can be advantageously eliminated. When different observation systems are used in the ranging and the shape measurement, it is necessary to specify that the height information obtained by the ranging expresses the height at which point of the surface shape obtained by the shape measurement, and it is difficult to accurately perform the position identifying processing. Accordingly, one or more embodiments of the present invention, the alignment between the shape measurement result and the ranging result can be eliminated from the standpoints of simplifying the processing and improving the accuracy. Further, the sharing of the observation system also contributes to the miniaturization and cost reduction of the apparatus.

The lighting device 3 in which the pieces of light having the different spectral distributions are incident in all the incidence angle directions is used as the lighting of the shape measurement, so that the orientation of the normal to the measuring target 4 can be determined from only one image with respect to the zenith angle component and the azimuth angle component. The image is taken only once, and the orientation of the normal is calculated by checking the table in which the correlation between the normal and the feature quantity is stored, so that the surface shape of the measuring target 4 can be simply measured (at high speed).

Figure 7:
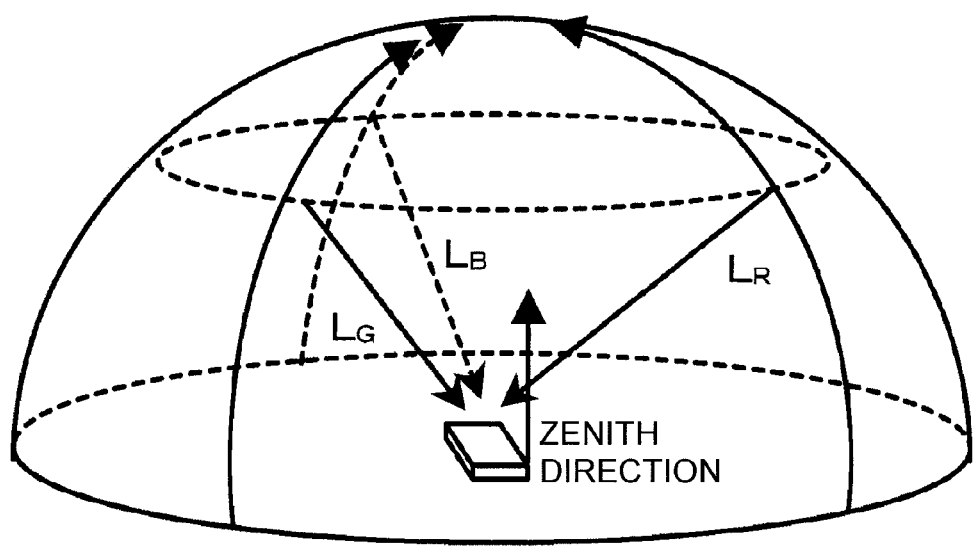
FIG. 7 is a view describing an effect of the color pattern of the lighting device.

When an image of a diffusing object (object whose reflectance property has a Lambertian property) is taken, the pieces of incident light from various directions are mixed in the image. In one or more embodiments of the present invention, in the light emission region of the lighting device 3, the three pieces of RGB component light are changed in equal directions (120 degrees with respect to one another) as shown in FIG. 2, and the degrees of changes of the three pieces of RGB component light are equalized. Accordingly, as shown in FIG. 7, the sum of light intensity per one color from all the azimuth angle directions becomes identical at any zenith angle in each color. The sum of light intensity becomes identical even if all the zenith angles are integrated. Therefore, the pieces of RGB component light incident to the camera positioned in the vertical direction of the diffusing object have the identical intensity, and the image of the diffusing object is taken with the white reflected light. That is, when the target whose image is taken includes both the mirror surface object (measuring target) and the diffusing object, the surface shape of the mirror surface object can be measured, and the image of the diffusing object can be taken as if the diffusing object was irradiated with the white light. Accordingly, for example, in performing the soldering inspection, the target (such as board and IC) except the soldering can be inspected based on the target color.

Figure 8:
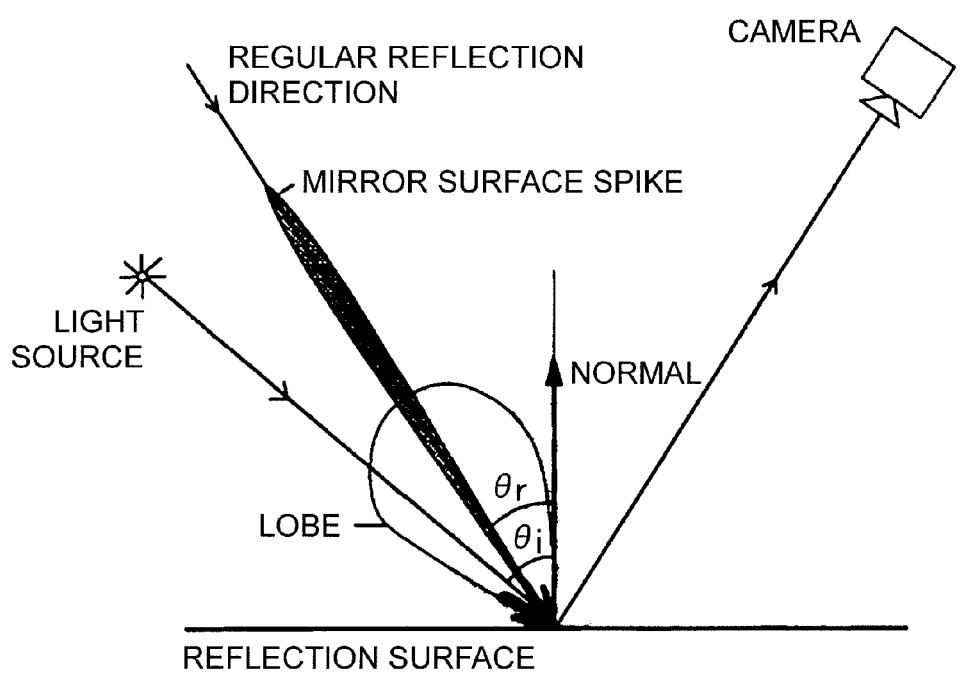
FIG. 8 is a view describing a reflectance property.

The measurement is accurately performed by utilizing the lighting device 3 even if the target has the uneven reflectance property. This will be described below. As shown in FIG. 8, the reflected light of the light incident to the object that does not have the perfect mirror surface includes the light (mirror surface spike) that is acute and narrow in the regular reflection direction and the light (mirror surface lobe) that spreads in a direction deviated from the regular reflection direction. The mirror surface lobe means the spread of the mirror surface reflected light, which is caused by a micro irregular surface (microfacet) on the measuring target surface. The spread of the mirror surface lobe increases as the orientation of the microfacet fluctuates, that is, as the surface is roughened. On the other hand, the measuring target surface comes close to the state of the perfect mirror surface with decreasing fluctuation of the spread of the microfacet. Here, the reflectance property is expressed by a deviation (angle) from the regular reflection direction and a light intensity ratio of the lobe to the spike. In the object having the uneven reflectance property, a shape of the mirror surface lobe varies according to surface roughness at each surface position. In the object having the extremely rough surface, the reflected light includes only the mirror surface lobe. In this case, the ratio of the mirror surface lobe and the mirror surface spike comes close to 1, and the mirror surface lobe and the mirror surface spike are hardly distinguished from each other.

Due to the spread of the mirror surface lobe, the luminance value in the taken image is influenced by not only the light from the light emission region (the region R in FIG. 4) corresponding to the object surface position but also the light from the surroundings of the light emission region. That is, in the object having the rough surface, the light from the light emission region corresponding to the regular reflection direction and the light from the surrounding region are mixed together, whereby a spectral property different from that of the perfect mirror surface is observed.

In such cases, if the lighting is performed such that the light from the surrounding region is just canceled to keep the spectral property similarly to that of the perfect mirror surface, the object having the uneven reflectance property or the object having the rough surface can be measured similarly to the object having the perfect mirror surface. In order to realize the measurement of the object having the uneven reflectance property or the object having the rough surface, in principle a light source distribution (lighting pattern) of the lighting device 3 is set as follows.

Figure 9:
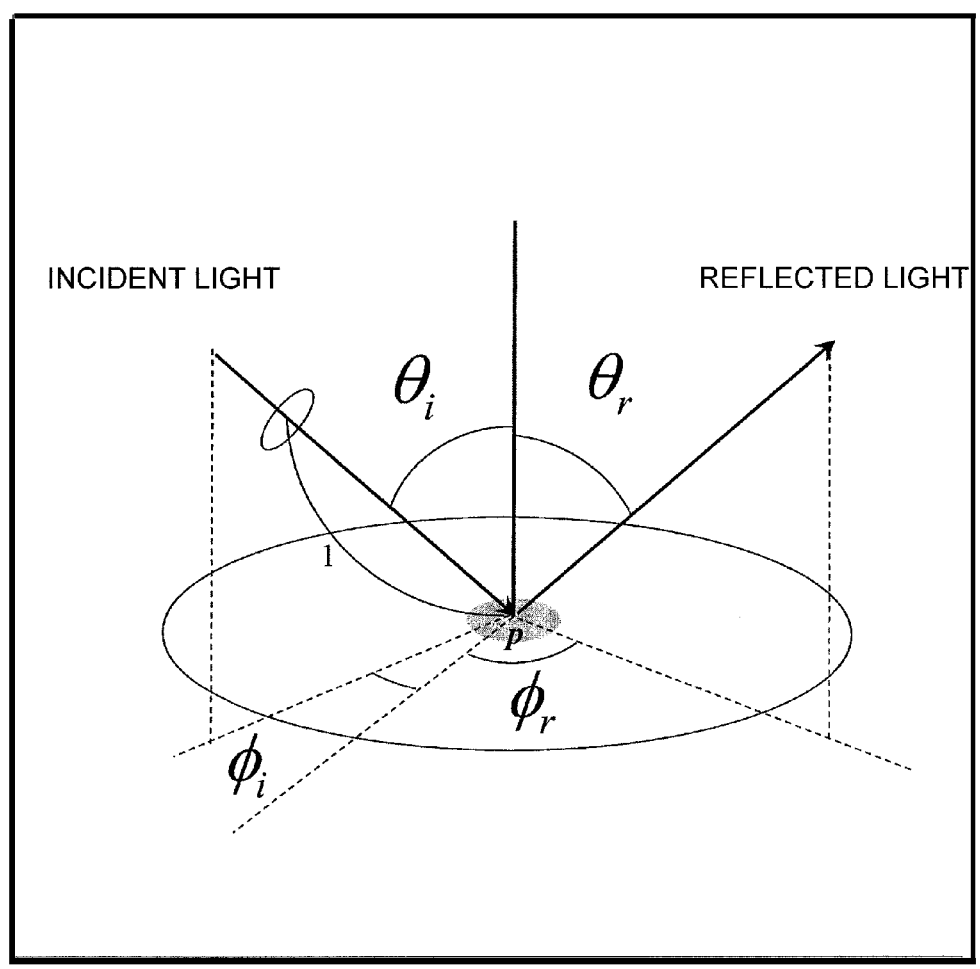
FIG. 9 is a view for describing incident light and reflected light.

Specifically, as shown in FIG. 9, assuming that Li(p, θi, φi) is radiance of the light source that is incident to a measuring point p from a direction of an incidence angle (θi, φi), the following equation holds for any normal vector at the point p and any point-symmetric region Ω on the light emission region:

$$\iint_\Omega L_i(p,\theta_i,\phi_i) \cdot f(p,\theta_i,\phi_i,\theta_r,\phi_r) \sin\theta_i d\theta_i d\phi_i = k_f L_i(p,\theta_r,\phi_r)$$ [Equation 1]

where p is the measuring point on the object surface, (θi, φi) is the incident direction of the light source (θ is the zenith angle component and φ is the azimuth angle component, hereinafter the same), (θr, φr) is the reflection direction of the light of the light source (a visual-line direction of the camera), f is the reflectance property of the point p, Ω is a prospect solid angle of the mirror surface lobe in the reflectance property f, and kf is an attenuation ratio of the radiance (depending on the reflectance property of the object surface).

In the lighting device 3 according to one or more embodiments of the present invention, the emission intensity of each of the pieces of RGB component light is set so as to change linearly with respect to the angle (longitude) (see FIG. 2 and FIGS. 3A and 3B). The lighting pattern in which the luminance changes linearly with respect to the angle (longitude) is one of approximate solutions of the equation. The lighting pattern of the lighting device 3, which is obtained by overlapping the patterns of the pieces of RGB component light, also becomes an approximate solution of the equation.

Figure 10:
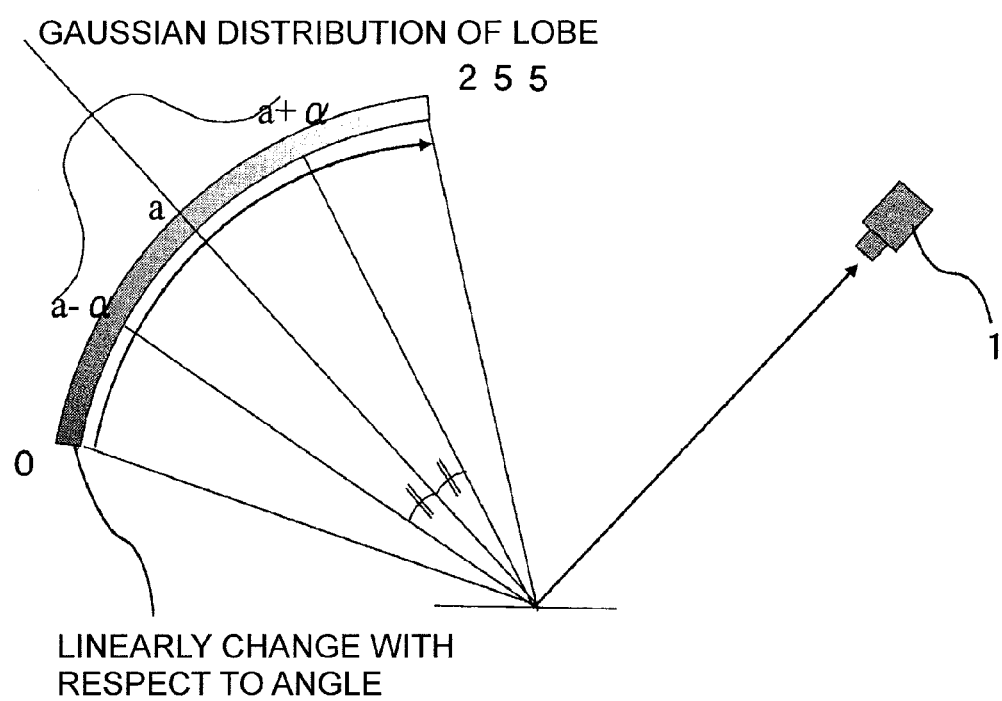
FIG. 10 is a view for describing a mirror surface lobe cancelling effect.

The influence of the mirror surface lobe can be canceled by using such a lighting pattern, and this will be described from another standpoint with reference to FIG. 10. FIG. 10 shows a one-dimensional direction of a direction of a change in luminance at which light close to ideal is obtained in order to describe an effect of the lighting pattern in one or more embodiments of the present invention. As shown in FIG. 10, only pieces of light from positions at an angle a (regular reflection direction), an angle a+α, and an angle a−α are considered. It is assumed that lobe coefficients σ of the pieces of light from the positions at the angles a+α and a−α are identical to each other. It is assumed that the emission intensity of the lighting device 3 is proportional to the angle, and it is assumed that (a−α)L, aL, and (a+α)L are the emission intensity in each of the positions at the angles a−α, a, and a+α. The pieces of light reflected from the three points are combined as σ(a−α)L+aL+σ(a+α)L=(1+2σ)aL, and it is found that the influence of the diffusion light of the light from the surrounding region is canceled. Although only the two points a±α are considered in this case, it is easily understood that the whole influence of the diffusion light of the light from the surrounding region is canceled. The same holds true for each of the pieces of RGB component light, and therefore the feature quantity expressed by the emission intensity ratio of the RGB colors becomes identical to that of the perfect mirror surface reflection. Accordingly, even if the object has the uneven reflectance property, similarly to the perfect mirror surface reflection, the surface shape of the measuring target can be accurately obtained from one taken image.

The above description is made in the direction in which the ideal effect is obtained. Although the linearity collapses in other directions not to be able to exactly cancel the influence of the diffusion reflection, the influence of the diffusion reflection can be removed within the practically trouble-free range.

<Modifications of Lighting Device>

Figure 11A:
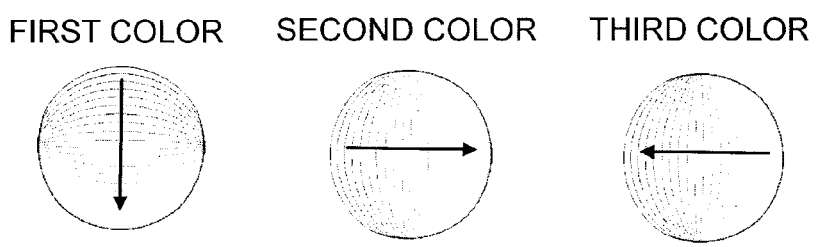
FIGS. 11A to 11C are views each showing a modification of a lighting pattern.
Figure 11B:
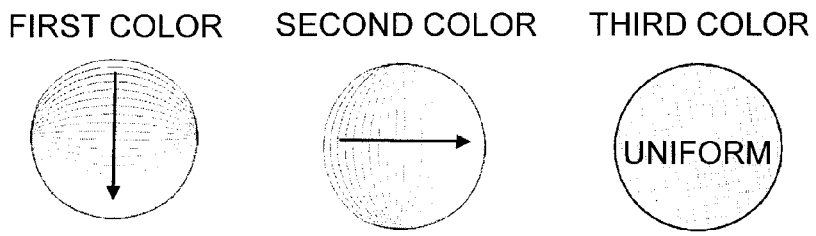

The patterns, in which the emission intensity of each of the three RGB colors changes in each of the directions different by 120 degrees with respect to one another according to the angle are overlapped, is used in the lighting device according to one or more embodiments of the present invention. However, the lighting pattern is not limited thereto. For example, like the patterns in which the three colors change in the downward, rightward, and leftward directions as shown in FIG. 11A, the patterns in which the three colors change in different directions may be combined. It is not always necessary that the three colors change according to the angle, but the patterns in which the light is emitted with even luminance over the whole surface in one color while remaining two colors change in different directions according to the angle may be used as shown in FIG. 11B.

Figure 11C:
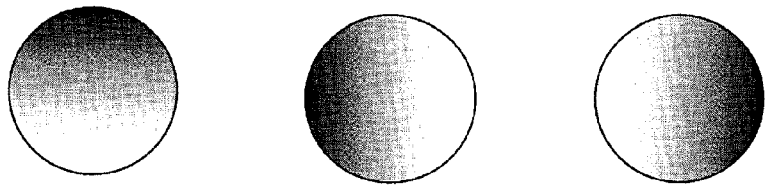

In one or more embodiments of the present invention, the three-dimensional shape of the target can be restored only by one-time measurement (lighting and image taking) using the lighting device in which the lighting patterns having the different color channels are overlapped. Alternatively, although the measuring time is lengthened compared with one or more embodiments of the present invention, the images are taken by sequentially lighting at least two kinds of the lighting patterns, and the three-dimensional shape may be restored using the obtained plurality of images. The same restoration result can also be obtained by this method. When the images are taken while the lighting patterns are switched, a plurality of monochrome lighting patterns having different luminance distributions can also be used as shown in FIG. 11C (in this case, a monochrome camera may be used).

Figure 12A:
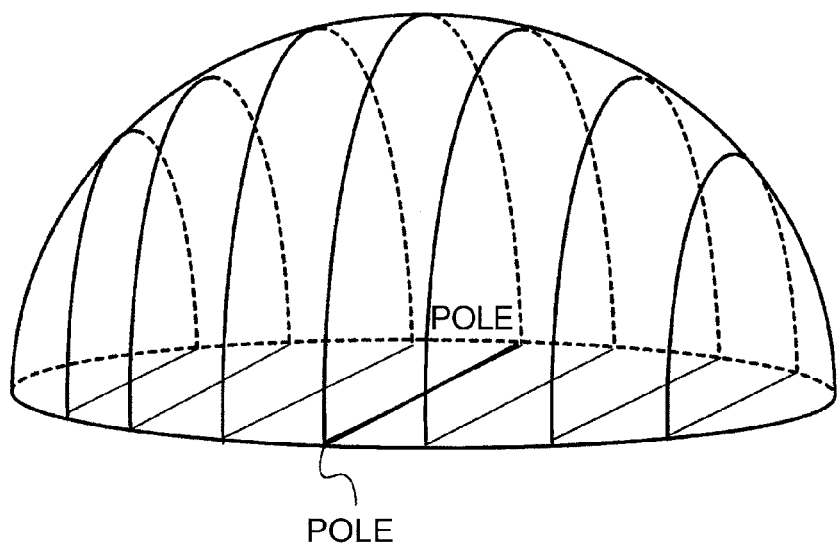
FIGS. 12A and 12B are views each showing a modification of a lighting pattern.
Figure 12B:
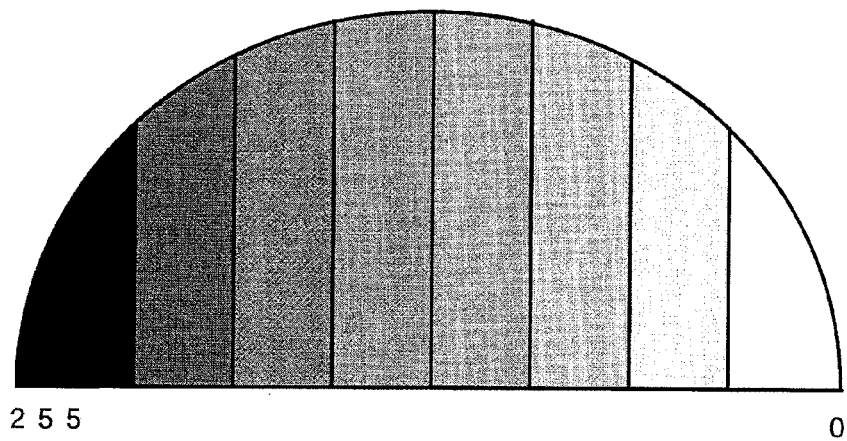

The lighting pattern in which the emission intensity changes linearly with respect to the angle in the longitude direction is used in one or more embodiments of the present invention. However, the lighting pattern is not limited thereto. For example, the lighting pattern in which the emission intensity changes linearly in the latitude direction is used as shown in FIGS. 12A and 12B. Such a lighting pattern is also one of the approximate solutions of the equation, and the influence of the mirror surface lobe can be substantially canceled to detect the regularly-reflected light.

Figure 13:
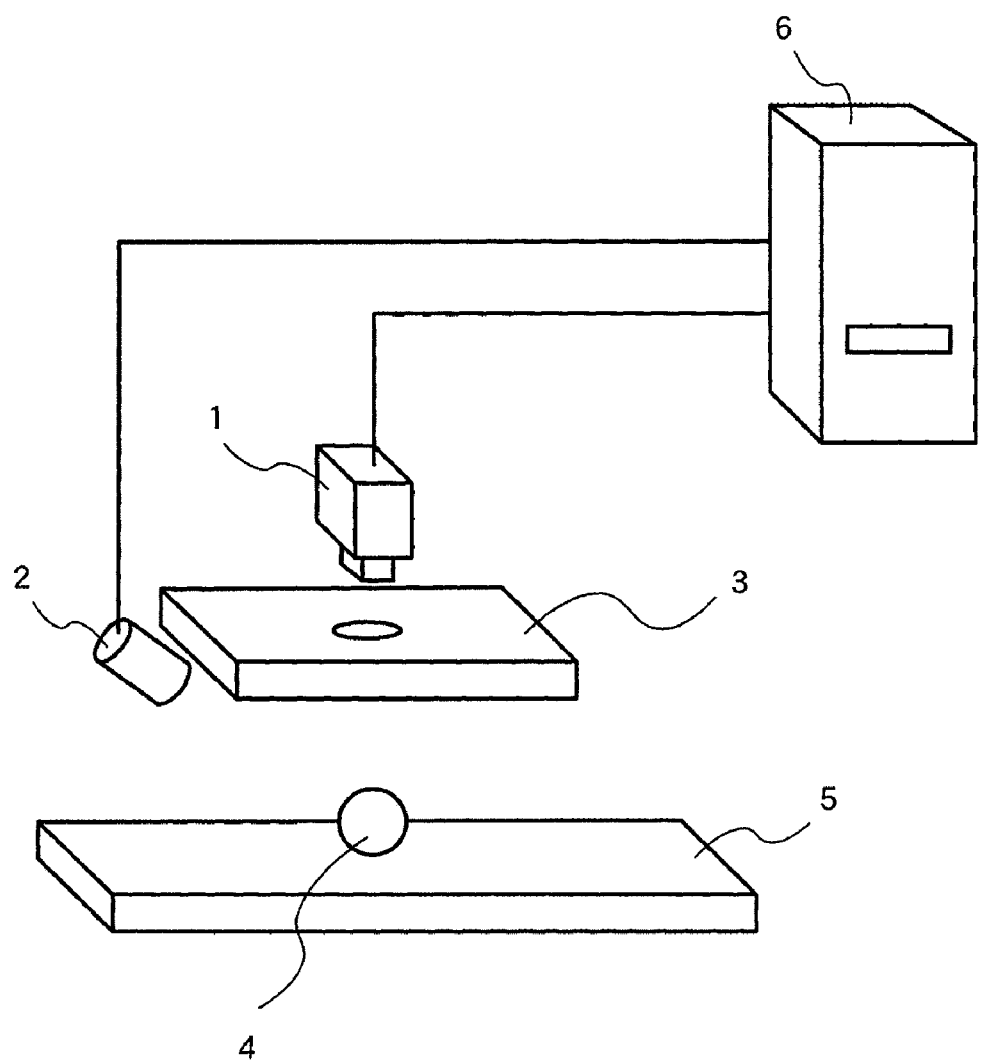
FIG. 13 is a view showing a configuration of a shape measuring apparatus including a plate-shaped lighting device.
Figure 14A:
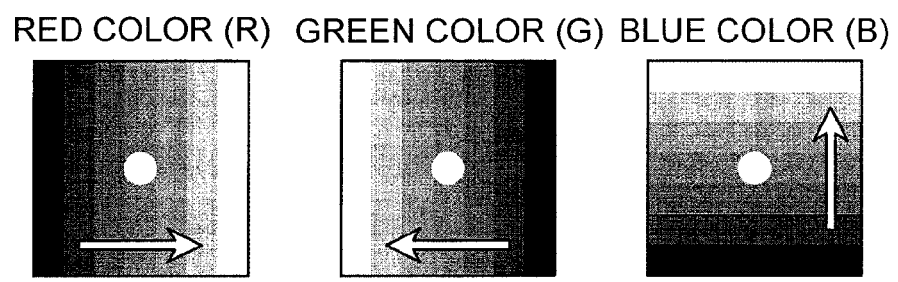
FIGS. 14A and 14B are views for describing a lighting pattern in the plate-shaped lighting device.
Figure 14B:
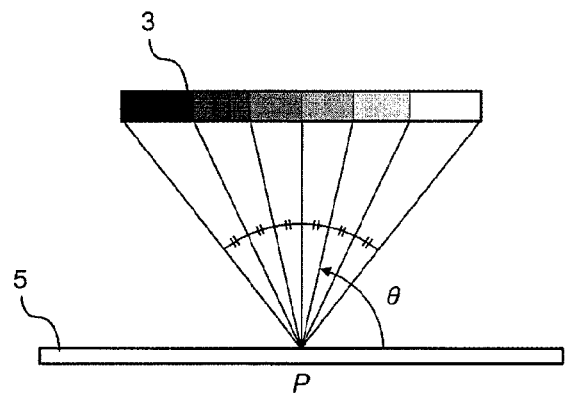

The shape of the lighting device 3 is not limited to the dome shape (hemispherical shape), but a plate shape as shown in FIG. 13 may also be used. A shape in which the plate is curved into an arc may also be used. Even in the lighting device 3 having the above shapes, when the lighting pattern is set such that spectral distributions of the light emission at all the positions in the light emission region differ from one another, the three-dimensional shape of the measuring target 4 can be restored by the one-time measurement. In an example of FIG. 14A, a red light (R) pattern in which the emission intensity increases rightward, a green light (G) pattern in which the emission intensity increases leftward, and a blue light (B) pattern in which the emission intensity increases upward are overlapped. Even in this case, as shown in FIG. 14B, the influence of the mirror surface lobe can be substantially canceled by linearly changing the emission intensity according to an angle θ in each pattern. Here, θ is an angle around a straight line that passes through a point P (the point at which the measuring target is disposed) and parallel to the measurement stage 5. Alternatively, θ can also be expressed as an angle that is formed by the plane parallel to the measurement stage 5 and the plane passing through the iso-emission intensity line (isochromatic line) on the light emission region of the lighting device 3 and the point P.

<Other Modification>

In one or more embodiments of the present invention, the ranging is performed by the phase shift method. Alternatively, any ranging method may be used as long as the height information on the object surface is obtained. Among others, a ranging method in which the height information is obtained by projecting the fringe or lattice pattern to the object to perform the image analysis of the pattern deformation is adopted from the standpoint of the sharing of the observation system (camera). This kind of ranging method includes, for example, an optical cutting method, a fringe analysis method, and the like. Needless to say, a ranging method other than the image analysis may be adopted. For example, a ranging sensor in which an X-ray, an infrared ray, or an ultrasonic wave is used may be used. In any method, when the height in at least one point can be specified on the object surface, the three-dimensional shape and position can be determined by combining the height information and the restored shape obtained by the normal integration.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A shape measuring apparatus that measures a three-dimensional shape of a measuring target, the apparatus comprising:
    a lighting device that irradiates the measuring target placed on a stage with light;
    an imaging device that takes an image of the measuring target;
    a shape calculating device that calculates orientations of normals at a plurality of points on a surface of the measuring target from an image, the image being obtained by performing imaging with the imaging device while the lighting device irradiates the measuring target with the light, the shape calculating device calculating the three-dimensional shape of the surface of the measuring target from the calculation result of the orientations of the normals;
    a ranging device that measures a distance from a predetermined reference position with respect to at least one point on the surface of the measuring target; and
    a determination device that determines a spatial position of the three-dimensional shape of the surface of the measuring target, the three-dimensional shape being obtained by the shape calculating device using information on the distance obtained by the ranging device.

2. The shape measuring apparatus according to claim 1, wherein
    the ranging device includes a projection device that projects a fringe pattern or a lattice pattern to the measuring target, and
    the ranging device calculates the distance of the point on the surface of the measuring target by analyzing the image of the measuring target, the image of the measuring target being taken while the fringe pattern or the lattice pattern is projected.

3. The shape measuring apparatus according to claim 2, wherein the imaging device also acts as a device with which the ranging device takes an image for ranging.

4. The shape measuring apparatus according to claim 3, wherein
    the lighting device is a surface light source including a light emission region having a predetermined size, and
    portions of light emitted from positions in the light emission region differ from each other in a spectral distribution.

5. The shape measuring apparatus according to claim 4, wherein
    the lighting device is the surface light source that emits light in which a plurality of different lighting patterns are overlapped with each other or sequentially emits the plurality of lighting patterns, and
    each of the lighting patterns is set such that emission intensity changes linearly with respect to an angle around a central axis, a specific straight line that is parallel to the stage to pass through a point at which the measuring target is placed being defined as the central axis.

6. The shape measuring apparatus according to claim 3, wherein
    the lighting device is the surface light source that emits light in which a plurality of different lighting patterns are overlapped with each other or sequentially emits the plurality of lighting patterns, and
    each of the lighting patterns is set such that emission intensity changes linearly with respect to an angle around a central axis, a specific straight line that is parallel to the stage to pass through a point at which the measuring target is placed being defined as the central axis.

7. The shape measuring apparatus according to claim 2, wherein
    the lighting device is a surface light source including a light emission region having a predetermined size, and
    portions of light emitted from positions in the light emission region differ from each other in a spectral distribution.

8. The shape measuring apparatus according to claim 7, wherein
    the lighting device is the surface light source that emits light in which a plurality of different lighting patterns are overlapped with each other or sequentially emits the plurality of lighting patterns, and
    each of the lighting patterns is set such that emission intensity changes linearly with respect to an angle around a central axis, a specific straight line that is parallel to the stage to pass through a point at which the measuring target is placed being defined as the central axis.

9. The shape measuring apparatus according to claim 2, wherein
    the lighting device is the surface light source that emits light in which a plurality of different lighting patterns are overlapped with each other or sequentially emits the plurality of lighting patterns, and
    each of the lighting patterns is set such that emission intensity changes linearly with respect to an angle around a central axis, a specific straight line that is parallel to the stage to pass through a point at which the measuring target is placed being defined as the central axis.

10. The shape measuring apparatus according to claim 1, wherein
    the lighting device is a surface light source including a light emission region having a predetermined size, and
    portions of light emitted from positions in the light emission region differ from each other in a spectral distribution.

11. The shape measuring apparatus according to claim 10, wherein
the lighting device is the surface light source that emits light in which a plurality of different lighting patterns are overlapped with each other or sequentially emits the plurality of lighting patterns, and
each of the lighting patterns is set such that emission intensity changes linearly with respect to an angle around a central axis, a specific straight line that is parallel to the stage to pass through a point at which the measuring target is placed being defined as the central axis.

12. The shape measuring apparatus according to claim 1, wherein
the lighting device is the surface light source that emits light in which a plurality of different lighting patterns are overlapped with each other or sequentially emits the plurality of lighting patterns, and
each of the lighting patterns is set such that emission intensity changes linearly with respect to an angle around a central axis, a specific straight line that is parallel to the stage to pass through a point at which the measuring target is placed being defined as the central axis.

13. A shape measuring method for measuring a three-dimensional shape of a measuring target, the method comprising the steps of:
irradiating the measuring target placed on a stage with light;
imaging the measuring target while irradiating the measuring target with the light;
calculating orientations of normals at a plurality of points on a surface of the measuring target from an image obtained in the imaging step, and calculating the three-dimensional shape of the surface of the measuring target from the calculation result by a shape calculating device;
measuring a distance from a predetermined reference position with respect to at least one point on the surface of the measuring target; and
determining a spatial position of the three-dimensional shape of the surface of the measuring target, the three-dimensional shape being obtained in the shape calculation step using information on the distance obtained in the ranging step by a determination device.

* * * * *

UNITED STATES PATENT AND TRADEMARK OFFICE
Certificate

Patent No. 8,334,985 B2                                      Patented: December 18, 2012

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: To Sho, Kizugawa (JP); Daisuke Mitsumoto, Nagaokakyo (JP); Yasuhiro Ohnishi, Kyotanabe (JP); Takeshi Kojima, Kyoto (JP); and Shree Nayar, New York, NY (US).

Signed and Sealed this Eighteenth Day of June 2013.

TARIFUR R. CHOWDHURY
                                                                    *Supervisory Patent Examiner*
                                                                             Art Unit 2886
                                                                    Technology Center 2800